Patented Mar. 2, 1948

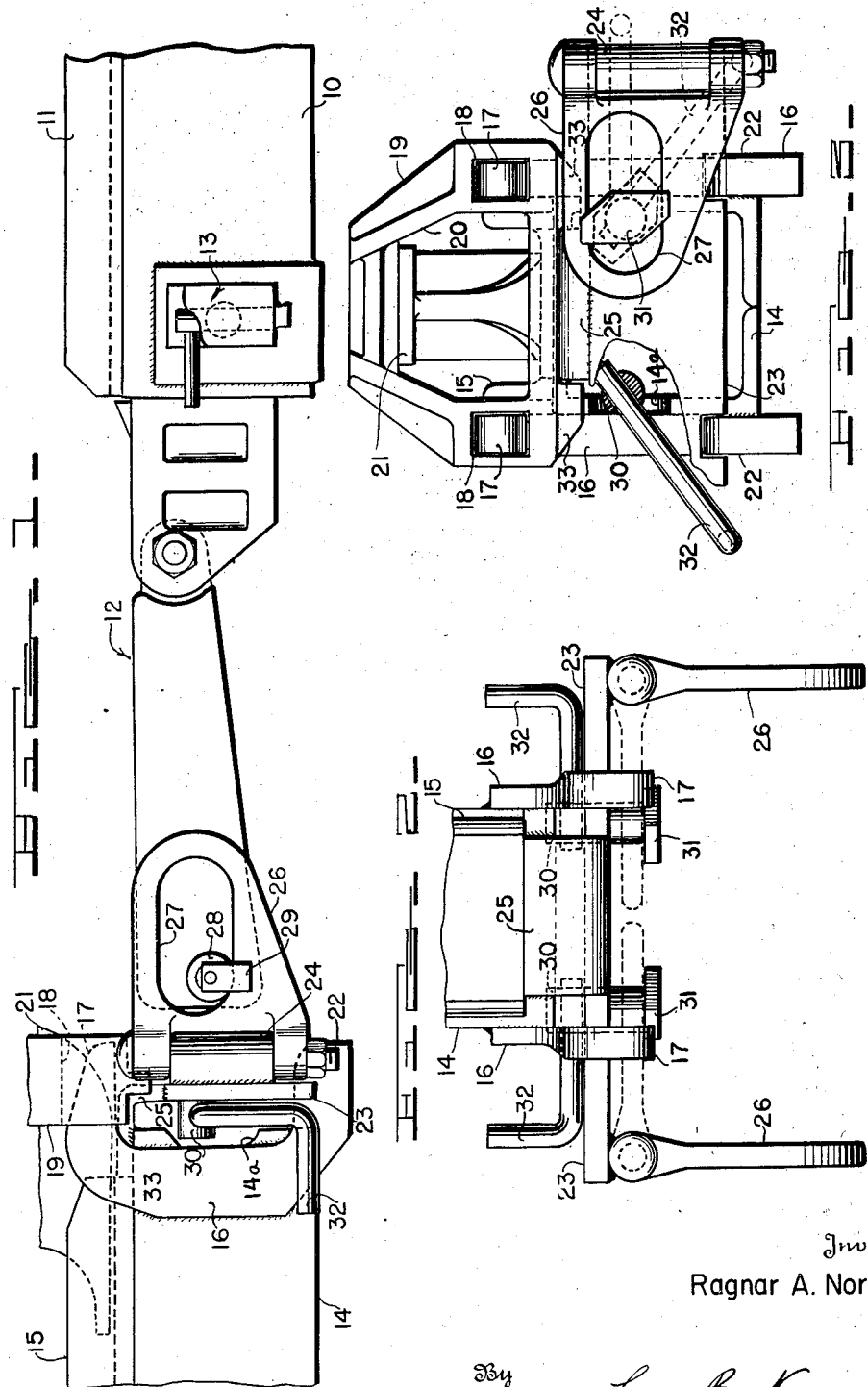

2,436,972

UNITED STATES PATENT OFFICE 2,436,972

MEANS FOR LOCKING CONTAINERS ON VEHICLES

Ragnar A. Norbom, New York, N. Y., assignor to National Fitch Corporation, a corporation of Delaware Application September 5, 1946, Serial No. 694,967

4 Claims. (Cl. 214—85)

This invention pertains to vehicles adapted to transport a demountable body or container and relates more particularly to means for locking such containers on a vehicle.

In U. S. Patents Nos. 2,266,790, issued December 23, 1941, and 2,304,115, issued December 8, 1942, to Ragnar A. Norbom, constructions are described which may be used to transfer a demountable container provided with skid rails from one vehicle, such as a railway car, to another vehicle, such as a highway truck or trailer, or from the highway truck or trailer to a railway car. Both types of vehicles are provided with transverse guideways to receive the skid rails of a demountable body or container. Suitable propulsion means or mechanism, including extensible bridges adapted to be connected to supporting members provided on the railway car, may be carried by the highway vehicle to effect such transfers, and such a vehicle may be said to be mechanized. In the aforementioned U. S. Patent No. 2,266,790, the extensible bridge members of the mechanized vehicle, when retracted, serve as one element of a locking device which retains the demountable container on the guideways of the mechanized vehicle. Reference may be made to the above mentioned patents for a better understanding of the subject matter disclosed therein.

This invention relates primarily to a vehicle, such as a highway truck or trailer or a railway car, provided with transverse guideways, to or from which a demountable body or container may be transferred from or to a mechanized vehicle. Such a vehicle may be said to be non-mechanized, since it has no mechanism or propulsion means to effect such transfers, the transfers being effected by the propulsion means on the mechanized vehicle. The invention is concerned with the means carried by a non-mechanized vehicle to which the bridge members of a mechanized vehicle may be connected and also with means for firmly locking the demountable container on the guideways of the non-mechanized vehicle in transportable position.

It is an object of this invention to provide an improved means for locking a demountable container on a vehicle.

It is another object of this invention to provide means which include connecting bridge attaching and supporting means for locking a demountable container on a vehicle.

Other objects and advantages of the invention will be apparent from the following description and accompanying drawings, in which:

Figure 1 is a fragmentary side elevational view of a mechanized vehicle connected to a non-mechanized vehicle constructed in accordance with this invention.

Figure 2 is a fragmentary plan view of the bridge supporting and demountable container locking mechanism of a non-mechanized vehicle. The container engaging element, or stirrup, has been omitted for clearer illustration.

Figure 3 is a fragmentary front elevational view corresponding to Figure 2 with the mechanism shown in locked position. Certain parts are broken away to provide a clearer illustration of the construction.

Referring now to Figure 1, the frame of the mechanized vehicle, a portion only of which is shown, is provided with transversely extending hollow beams 10 which support upwardly facing transverse channels 11 forming guideways adapted to receive the skid rails of a demountable container, not shown. Telescopically housed within the hollow beams 10 are bridges, generally indicated at 12, extensible, as shown, to connect to another vehicle. Means to lock the bridges 12 in retracted or extended position are indicated generally at 13. The construction thus far described is shown and described more fully in U. S. Patent No. 2,304,115, to which reference has been made heretofore.

The frame of the non-mechanized vehicle, a portion only of which is shown in the drawings, also is provided with transversely extending hollow beams 14 which support upwardly facing transverse channels 15 forming skid rail guideways. Welded or otherwise suitably secured to opposite sides of the hollow beams 14 are brackets 16, the upper portions of which have outwardly extending guiding projections or fingers 17. As best shown in Figure 3, the minor openings 18 of a stirrup 19 are adapted to slide over these fingers 17 with the opening 20 of the stirrup receiving the projecting end of a skid rail 21 of a demountable container. This construction is shown and described more fully in previously mentioned U. S. Patent No. 2,266,790.

Supported on outwardly extending lower portions 22 of the brackets 16 is a supporting plate 23 having hinge supporting lugs 24 welded or otherwise suitably secured in vertical position to the ends thereof. An angled plate member 25 welded to or formed integral with the top of the supporting plate 23 extends over the end of the hollow beam 14 and registers with the bottom of the channel 15. The length of the plate 25 corresponds roughly to the inside width of the channel 15. That portion of the plate 25 which rests on the upper surface of the hollow beam 14 may be welded or otherwise suitably secured thereto to complete the supporting structure. Hinged to the lugs 24 are supporting elements or wings 26 provided with elongated openings 27 through which passes the transverse bar 28 provided on the connecting end of the bridge 12. The bar 28 may carry a loose rod with downwardly projecting ends 29 to prevent inadvertent withdrawal of the bar from the wings 26.

The supporting plate 23 also carries wing lock elements, each of which has a shaft portion 30, which extends through a suitable circular opening formed in the supporting plate, and a detent or keeper 31 secured to the outer end thereof. An operating arm 32 is affixed to the inner end of the shaft portion 30 which extends through the plate 23, for manual rotation of the shaft and locking detent. With the proportions shown, the sides of the hollow beam 14 are cut away, as indicated at 14a, to provide necessary clearance for the lock elements and operating handles.

After a demountable container has been transferred from a mechanized vehicle to a non-mechanized vehicle, the stirrups 19 are placed in retaining position, as shown in Figures 1 and 3. The connecting bridge 12 is detached and the wings 26 are folded against the frame of the non-mechanized vehicle, as shown in Figure 3 and in dotted lines in Figure 2. In folded position, the wings 26 engage the downward projections or surfaces 33 on the stirrup 19 to hold the stirrup in place. When the wings 26 are being folded against the frame, the operating handles 32 are held in raised position as shown in dotted lines in Figure 3, to allow the elongated openings 27 in the wings to pass over the detents 31. The operating handles 32 then may be lowered to turn the detents 31 into locking position, shown in Figure 3, to hold the wings in folded position. Since gravity holds the operating handles 32 in locking position, any jarring or vibration, caused by the movement of the vehicle in transit, will not be apt to raise the handles to unlocked position. Thus, the demountable container is retained securely in place on the non-mechanized vehicle while in transit.

Although a specific embodiment of the invention has been described and illustrated, it will be realized that various structural changes may be made without departing from the spirit of the invention. Therefore, the invention encompasses all variations and embodiments which fall within the scope of the following claims.

I claim:

1. The combination of a vehicle adapted to support a demountable container, a device engageable with said vehicle and said container to retain the container on said vehicle, foldable members hinged to a side of said vehicle for supporting one end of a bridge detachably connectable to said vehicle, and means including said members for locking said device in retaining position.

2. A vehicle having guideways to receive skid rails of a demountable body which may be carried by said vehicle, a stirrup engageable with said vehicle and a skid rail of a demountable body to retain the body on the vehicle, members hingedly mounted on a side of said vehicle adjacent the ends of said guideways, said members when extending outwardly of said vehicle being adapted to support one end of a bridge detachably connectable to said vehicle and when folded against said side of the vehicle being effective to lock said stirrup in retaining position, and means for locking said hinged members in folded position.

3. A lock for securing a demountable container on a vehicle, the combination comprising: means engageable with the container and the vehicle for retaining the container on the vehicle, members having elongated openings therein hingedly mounted on a side of the vehicle adjacent said means, said members when extending outwardly of said vehicle being adapted to support one end of a detachable connecting bridge and when folded against said side of the vehicle being effective to lock said means in retaining position, and a rotatable detent extending through said openings to lock said members in folded position.

4. A vehicle having guideways to receive skid rails of a demountable container which may be carried by said vehicle, a stirrup engageable with the projecting end of a skid rail of a demountable container on said vehicle, means on said vehicle engageable with said stirrup to retain the container on the vehicle, members having elongated openings therein hingedly mounted on said vehicle on opposite sides of said means adjacent the ends of said guideways, said members when projecting outwardly of said vehicle being adapted to support one end of a detachable connecting bridge and when folded against the side of said vehicle acting to lock said stirrup in retaining position, and a rotatable detent projecting through said openings when said members are in folded position to lock said members in folded position.

RAGNAR A. NORBOM.

REFERENCES CITED

The following references are of record in the file of this patent:

UNITED STATES PATENTS

| Number | Name | Date |
|---|---|---|
| 1,966,492 | Fildes | July 17, 1934 |
| 2,266,789 | Norbom | Dec. 23, 1941 |
| 2,266,790 | Norbom | Dec. 23, 1941 |
| 2,348,269 | Stevens | May 9, 1944 |

FOREIGN PATENTS

| Number | Country | Date |
|---|---|---|
| 206,368 | Germany | Feb. 1, 1909 |